March 16, 1926.

E. F. PAWSAT 1,577,146

MUD GUARD BRACKET

Filed Feb. 24, 1925

INVENTOR:
Ewald F. Pawsat,
BY Arthur H. Ewald,
ATTORNEY.

Patented Mar. 16, 1926.

1,577,146

UNITED STATES PATENT OFFICE.

EWALD F. PAWSAT, OF MAYSVILLE, KENTUCKY, ASSIGNOR TO WALD MANUFACTURING COMPANY, OF MAYSVILLE, KENTUCKY, A CORPORATION OF KENTUCKY.

MUD-GUARD BRACKET.

Application filed February 24, 1925. Serial No. 11,281.

*To all whom it may concern:*

Be it known that I, EWALD F. PAWSAT, a citizen of the United States, and resident of Maysville, in the county of Mason and State of Kentucky, have invented certain new and useful Improvements in Mud-Guard Brackets, of which the following is a full, clear, and exact description, reference being had to the accompanying drawings, forming a part of this specification.

The present invention relates to mud guard brackets of the type usually used in motorcycle or bicycle construction, and has particular reference to the provision of improvements over the type of bracket disclosed in my Letters Patent No. 1,510,603, of October 7th, 1924.

The principal object of this invention is to provide further improvements over the construction described in said Letters Patent, and further to strengthen and re-enforce the same without sacrificing any of the advantages of the bracket therein disclosed.

Further objects of the invention will appear from the following detailed description thereof.

Figure 1:
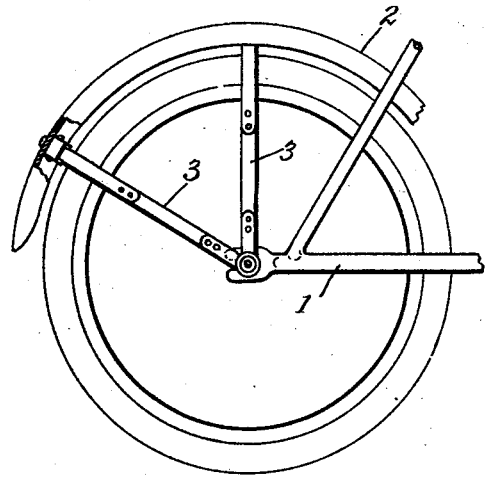
Figure 1 is an elevation of a mud guard bracket constructed in accordance with this invention, as applied to the wheel of a bicycle, the mud guard being broken away at the point of union to disclose the assembly.

The numeral 1 indicates the frame of a bicycle of ordinary construction, and 2 the rear mud guard. The mud guard is secured to the frame by means of brackets each of which consists of substantially parallel legs 3, the free ends of which are provided with the necessary attaching or securing perforations or other means. The legs 3 may be of unitary construction or may be pieced, as shown in Figure 1. The legs 3 are joined by means of a curved or bowed section 4 which is provided with a central perforation for a bolt 5. The outer surface of the bow 4 is shaped to fit into the cross-sectional curve of the mud guard 2.

Figure 2:
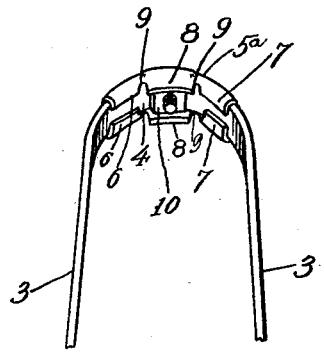
Figure 2 is a perspective of a portion of a bracket constructed in accordance with this invention.
Figure 3:
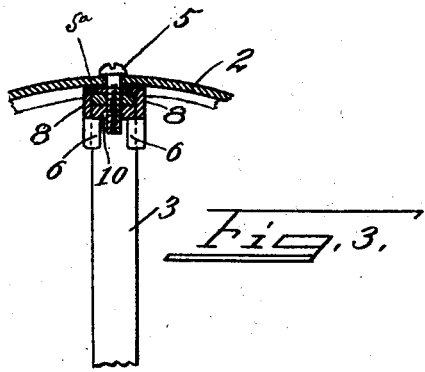
Figure 3 is a sectional view of the bracket and mud guard in assembly.

The numeral $5^a$ indicates a re-enforcing plate which, when ready for assembly with the bracket, is of substantially channeled construction, having flanges 6—6, 7—7, and 8—8, flanges 8 being separated from the flanges 6—6 and 7—7 by means of notches 9, as shown in Figure 2. When the plate $5^a$ is assembled on the bracket, the flanges 6—6 and 7—7 are bent over so as to engage securely the edges thereof, as clearly shown in Figure 2, the flanges 8—8 extending downwardly and in substantially parallel relation with the edges of the bracket. The re-enforcing plate $5^a$ is provided between the flanges 8—8 with a perforation for the bolt 5.

In assembling a mud guard bracket constructed in accordance with this invention, the flanges 8—8 are adapted to secure the nut 10 against rotation, thus facilitating the tightening of the parts.

From the foregoing description, it will be seen that I have provided a mud guard bracket greatly re-enforced at the bow, which has heretofore been the weakest point of devices of this type. This bracing effect consists not only of the application of a separate re-enforcing plate whereby the advantage of increased strength and rigidity is obtained, but also by reason of the outwardly extending flanges 8 which serve greatly to strengthen and rigidify the bow of the plate and hence of the bracket itself.

Having thus fully described my invention, what I claim as new and desire to secure by Letters Patent is:

1. In combination with a mud guard bracket provided with a bolt hole intermediate its ends, a re-enforcing plate adapted to be assembled with said bracket, said plate being provided with a bolt hole adapted to register with the hole in said bracket when assembled, two pairs of opposed flanges at the ends of said plate arranged to grip said bracket to secure the plate thereon, and a pair of opposed flanges intermediate the pairs of opposed end flanges, said intermediate flanges being adapted to extend in substantially parallel relation with the edges of said bracket on opposite sides of said bolt holes.

2. In a mud guard bracket, a re-enforcing plate having a bolt opening, said plate being of channel construction, the flanges being provided with opposed notches so as to form pairs of end flanges whereby the plate may be secured to a bracket, and an intermediate pair of re-enforcing flanges on opposite sides of said bolt hole, adapted to form a recess for the head or nut of a bolt to prevent turning.

EWALD F. PAWSAT.